United States Patent
Wigger

(10) Patent No.: US 11,858,456 B2
(45) Date of Patent: Jan. 2, 2024

(54) SEATBELT SYSTEM HAVING A PRETENSIONER AND A LOCKING MECHANISM

(71) Applicant: Rivian IP Holdings, LLC, Irvine, CA (US)

(72) Inventor: Henning Wigger, Detroit, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/688,484

(22) Filed: Mar. 7, 2022

(65) Prior Publication Data

US 2023/0278522 A1    Sep. 7, 2023

(51) Int. Cl.
*B60R 22/195* (2006.01)
*B60R 22/28* (2006.01)

(52) U.S. Cl.
CPC .......... *B60R 22/1954* (2013.01); *B60R 22/28* (2013.01)

(58) Field of Classification Search
CPC ... B60R 22/19; B60R 22/195; B60R 22/1954; B60R 22/28; B60R 22/341; B60R 22/46
See application file for complete search history.

(56) References Cited

U.S. PATENT DOCUMENTS

| | | | | |
|---|---|---|---|---|
| 3,486,203 A * | 12/1969 | Cadiou | .............. | A44B 11/2557 D11/216 |
| 4,422,669 A * | 12/1983 | Chiba | ................. | B60R 22/1955 297/480 |
| 4,588,207 A * | 5/1986 | Doty | ....................... | B60R 22/30 280/801.1 |
| 5,294,150 A * | 3/1994 | Steffens, Jr. | ........ | B60R 22/1951 297/480 |
| 5,309,606 A * | 5/1994 | Kawamura | ........ | A44B 11/2557 24/171 |
| 5,340,152 A * | 8/1994 | Fohl | .................... | B60R 22/1952 180/274 |
| 5,533,756 A * | 7/1996 | Dybro | ................. | B60R 22/3413 280/806 |
| 5,588,608 A * | 12/1996 | Imai | .................... | B60R 22/4619 242/374 |
| 5,664,807 A * | 9/1997 | Bohmler | ................. | F16F 7/127 280/805 |
| 5,794,978 A * | 8/1998 | Nishide | ................... | F16D 41/12 74/577 M |

(Continued)

*Primary Examiner* — Barry Gooden, Jr.
(74) *Attorney, Agent, or Firm* — Haley Guiliano LLP

(57) ABSTRACT

A system for providing occupant restraint includes a seatbelt, a tensioning mechanism, and a locking mechanism. The seatbelt may include an upper portion and a lower portion, or just a single span. The tensioning mechanism is configured to remove slack in one or more portions of the seatbelt in response to an event such as an impact event. The locking mechanism is configured to lock an end of the seatbelt after the tensioning mechanism removes the slack, to prevent the seatbelt from extending. A connector may be included that defines an upper portion of the seatbelt and a lower portion of the seatbelt. The tensioning mechanism may include a load limiter to lessen a force transmitted to the seatbelt during tensioning. The load limiter may include an energy absorption element. The tensioning mechanism and the locking mechanism may be coupled to either span.

19 Claims, 6 Drawing Sheets

(56) References Cited

U.S. PATENT DOCUMENTS

| | | | | |
|---|---|---|---|---|
| 5,806,148 A * | 9/1998 | McFalls | A44B 11/2561 | |
| | | | 24/171 | |
| 6,036,274 A * | 3/2000 | Kohlndorfer | B60R 22/1952 | |
| | | | 297/480 | |
| 6,139,058 A * | 10/2000 | Bohmler | B60R 22/1955 | |
| | | | 60/632 | |
| 6,145,881 A * | 11/2000 | Miller, III | B60R 22/20 | |
| | | | 280/808 | |
| 6,250,720 B1 * | 6/2001 | Wier | B60R 22/4619 | |
| | | | 297/480 | |
| 6,336,664 B1 * | 1/2002 | Roder | B60R 22/341 | |
| | | | 297/480 | |
| 6,343,760 B1 * | 2/2002 | Smithson | B60R 22/38 | |
| | | | 242/383.2 | |
| 6,419,271 B1 * | 7/2002 | Yamada | B60R 22/1952 | |
| | | | 280/801.1 | |
| 7,188,868 B2 * | 3/2007 | Yamaguchi | B60R 22/1952 | |
| | | | 280/806 | |
| 7,490,857 B2 * | 2/2009 | Tomita | B60R 22/1952 | |
| | | | 280/806 | |
| 7,784,874 B2 * | 8/2010 | Murphy | B60R 22/28 | |
| | | | 297/472 | |
| 8,226,122 B2 * | 7/2012 | Lane, Jr. | B60R 22/1955 | |
| | | | 297/480 | |
| 8,585,090 B2 * | 11/2013 | Lane, Jr. | B60R 22/1955 | |
| | | | 297/480 | |
| 8,801,038 B2 * | 8/2014 | Hori | B60R 22/00 | |
| | | | 24/593.1 | |
| 9,068,306 B2 * | 6/2015 | Gisslin | F16F 7/123 | |
| 10,953,849 B2 * | 3/2021 | Hiruta | B60R 22/4604 | |
| 11,135,995 B2 * | 10/2021 | Schaub | B60R 22/185 | |
| 2003/0047931 A1 * | 3/2003 | Rees | B60R 22/1952 | |
| | | | 280/806 | |
| 2004/0251366 A1 * | 12/2004 | Hishon | B60R 22/44 | |
| | | | 242/390.8 | |
| 2004/0256850 A1 * | 12/2004 | Yamaguchi | B60R 22/1952 | |
| | | | 280/806 | |
| 2009/0096201 A1 * | 4/2009 | Hiramatsu | B60R 22/4676 | |
| | | | 280/806 | |
| 2011/0270493 A1 * | 11/2011 | Tanaka | B60R 22/48 | |
| | | | 701/45 | |
| 2017/0225650 A1 * | 8/2017 | Uchibori | B60R 22/341 | |
| 2017/0291572 A1 * | 10/2017 | Burczyk | B60R 22/19 | |
| 2018/0154861 A1 * | 6/2018 | Sugiyama | B60R 22/46 | |
| 2020/0198573 A1 * | 6/2020 | Gray | B60R 22/28 | |

* cited by examiner

SEATBELT SYSTEM HAVING A PRETENSIONER AND A LOCKING MECHANISM

INTRODUCTION

The present disclosure is directed to a seatbelt system having a tensioning mechanism and a locking mechanism.

SUMMARY

Vehicle occupant restraint systems can include a belt having a shoulder span and a lap span. The shoulder and lap spans can be under pre-tensioning forces determined by pre-tensioning power, seat-base and seat-back cushion stiffness, slack in an occupant's clothes, pre-tightening of belt by occupant when buckling up, loosening by occupant, or a combination thereof. In some circumstances, the above parameters might result in a combination that leaves slack in the belt, which can reduce the efficiency of the restraint system. It would be advantageous for the restraint system to take up slack in the belt using a tensioner before restraining the occupant.

In some embodiments, the present disclosure is directed to a system for providing occupant restraint. The system includes a seatbelt, a tensioning mechanism, and a locking mechanism. In some embodiments, a connector is included that defines an upper portion of the seatbelt and a lower portion of the seatbelt, each having two respective ends. In some embodiments, the system includes a mechanism for tensioning the seatbelt. For example, in some embodiments, a lower mechanism or an upper mechanism includes the tensioning mechanism which is configured to remove slack in the seatbelt in response to an event. In a further example, in some embodiments, the lower mechanism also includes the locking mechanism which is configured to lock the end of the seatbelt after the tensioning mechanism removes the slack.

In some embodiments, the tensioning mechanism includes a piston and a cylinder, a cable, an actuator, and a limit switch. The piston is configured to translate along the cylinder. The cable includes a first end and a second end, and is coupled to the seatbelt at the first end and coupled to the piston at the second end. The actuator is an electromagnetic actuator, a pneumatic actuator, a hydraulic actuator, a spring-loaded actuator, a squib charge, or another suitable device for applying tension in response to an event. For example, in some embodiments, the actuator includes a squib charge configured to cause the piston to translate along the cylinder to apply tension to the seatbelt based on pressure created during a chemical reaction. The limit switch is arranged at a position along the cylinder and configured to provide a signal when the piston reaches the position.

In some embodiments, the tensioning mechanism may be load limiting tensioning mechanism that includes a structure, an energy absorption element (e.g., a deformable spring), a cable and a mechanism. The structure is affixed to an end of the seatbelt. In some suitable approaches, the structure comprises a plate (e.g., a metal plate). The energy absorption element is coupled to the structure (e.g., using one or more pins) and is configured to apply a force, plastically deform, or both. For example, in some embodiments, the cable is engaged with the energy absorption element and is configured to receive the force. The mechanism is configured to apply a first tension to the cable, and the energy absorption element allows a second tension, less than the first tension, to be applied to the structure. For example, the energy absorption element provides load limiting (e.g., the reduction in force as experienced by the structure and thus belt). In some embodiments, the tension mechanism is a load limiting tensioning mechanism including a wire formed in a double-u shape.

In some embodiments, the locking mechanism includes a structure affixed to the first end, and the structure includes at least one detent. The locking mechanism also includes a latch affixed to the vehicle and configured to engage with the detent to lock the end of the lower portion after the tensioning mechanism removes the slack.

In some embodiments, the locking mechanism includes a first element that is configured to move with the seatbelt, a second element that is configured to engage with the first element to prevent the first element from moving, and a latch that is configured to lock the second element against the first element to lock the end of the lower portion after the tensioning mechanism removes the slack.

In some embodiments, the system includes control circuitry coupled to the tensioning mechanism, which may include one of two or more tensioning mechanisms. The control circuitry is configured to detect the event, and transmit a control signal to the tensioning mechanism in response to the event. The control signal causes the tensioning mechanism to apply a tension. In some embodiments, the system includes control circuitry coupled to the locking mechanism and configured to detect the event, and transmit a control signal to the locking mechanism in response to the event. The control signal causes the locking mechanism to prevent the seatbelt from extending. In some embodiments, the system includes control circuitry coupled to the tensioning mechanism and to the locking mechanism. In some such embodiments, the control circuitry is configured to transmit a first control signal to the tensioning mechanism in response to the event. The first control signal causes the tensioning mechanism to apply a tension. Further, in some embodiments, the control circuitry is configured to transmit a second control signal to the locking mechanism. The second control signal causes the locking mechanism to prevent the seatbelt from extending.

In some embodiments, the present disclosure is directed to a system for providing occupant restraint that includes a seatbelt, a tensioning mechanism, and a locking mechanism. In some embodiments, the seatbelt includes an upper portion of the belt and a lower portion. The tensioning mechanism is configured to remove slack in the seatbelt by applying a tension in response to an event. The locking mechanism is configured to lock the end of the seatbelt after the tensioning mechanism removes the slack to prevent lengthening of the seatbelt.

In some embodiments, the tensioning mechanism includes a piston and a cylinder, a cable, an actuator, and a limit switch. The piston is configured to translate along the cylinder. The cable includes a first end and a second end, and is coupled to the seatbelt at the first end and coupled to the piston at the second end. The actuator includes a squib charge or other component for generating force, and is configured to cause the piston to translate along the cylinder to apply tension to the seatbelt. The limit switch is arranged at a position along the cylinder and configured to provide a signal when the piston reaches the position.

In some embodiments, the tensioning mechanism includes a structure, an energy absorption element, a cable, and a mechanism. The structure is affixed to a first end of the seatbelt, and the structure includes at least one feature. The energy absorption element is coupled to the structure and is configured to apply a force, plastically deform, or both. The cable is engaged with the energy absorption element and is configured to receive the force. The mechanism is configured to apply a first tension to the cable, and the energy absorption element is configured for load limiting, allowing a second tension, less than the first tension, to be applied to the structure.

In some embodiments, the locking mechanism includes a structure affixed to a first end of the seatbelt, where the structure includes at least one detent. The locking mechanism also includes a latch affixed to the vehicle that is configured to engage with the detent to lock the end of the seatbelt after the second tensioning mechanism removes the slack.

In some embodiments, the present disclosure is directed to a method of tightening a seatbelt. The method includes detecting a vehicle event corresponding to impact; tensioning, using a tensioning mechanism, the seatbelt to remove slack in; and locking, using a locking mechanism, the seatbelt to prevent displacement of the seatbelt. In some embodiments, the seatbelt comprises an upper portion and a lower portion and tensioning comprises tensioning the lower portion to remove slack in the lower portion.

In some embodiments, the method includes achieving a first state prior to detecting the event, wherein the seatbelt (e.g., a lower portion) comprises a first tension; and achieving a second state after tensioning the seatbelt, wherein the seatbelt comprises a second tension. For example, in some embodiments, the first state corresponds to the occupant applying the seatbelt, and the second state corresponds to a state during an event, achieved in response to the event. In some embodiments, in the first state, the seatbelt is slack and the first tension is null; and in the second state, the second tension is greater than zero.

In some embodiments, the method includes releasing tension on the seatbelt by disengaging the tensioning mechanism; and unlocking the seatbelt, by disengaging the locking mechanism, to allow displacement of the seatbelt (e.g., the lower portion).

In some embodiments, tensioning the seatbelt includes receiving a first force at an energy absorption device and transmitting a second force that is less than the first force to the seatbelt. For example, the tensioning mechanism is configured for load limiting to reduce forces acting on the seatbelt during tensioning.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure is directed to vehicle occupant restraint systems that apply tension and lock in response to an event. In some embodiments, the system includes a force-limiting mechanism. The force-limiting mechanism ensures that a determined force threshold is never exceeded during a pre-tensioning phase for both the shoulder and lap spans of the belt. In some embodiments, force-limiting is accomplished for the shoulder portion by using a retractor that is pretensioned through a torsion bar, and for the lap portion using a pretensioner (e.g., a tensioning mechanism).

In the event of a crash, impulse, or other detected event for which an occupant may be accelerated relative to the seat and vehicle (also referred to herein as "an event"), the restraint system applies tension to remove slack in a belt span before locking the length of the belt. This process allows the belt to be cinched before locking, reducing movement of the occupant away from the seat during an event.

Figure 1:
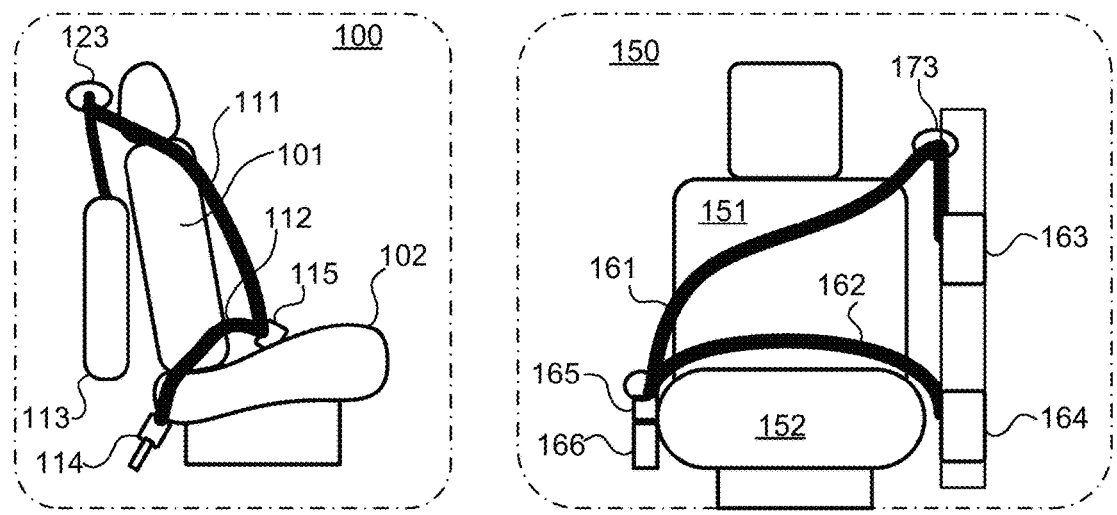
FIG. 1 shows a front view and a side view of illustrative vehicle seats having restraint systems, in accordance with some embodiments of the present disclosure.

FIG. 1 shows a front view and a side view of illustrative vehicle seats having restraint systems, in accordance with some embodiments of the present disclosure.

Panel 100 shows a side view of a system that includes a seat and restraint system. The seat includes upper portion 101 and lower portion 102. The restraint system includes a seatbelt (also referred to herein as "belt") having upper span 111 and lower span 112, which is anchored at upper tensioner 113 and lower tensioner 114. In some embodiments, the belt passes through connector 115, which may include a passthrough (e.g., a D-loop or other ring) and a buckle mechanism. For example, upper span 111 and lower span 112 may be spans of a single belt passing through a loop of connector 115. In some embodiments, upper span 111 and lower span 112 are separate belts, each connected to connector 115.

In an illustrative example, an occupant may sit on lower portion 102 and lean back against upper portion 101. After sitting, the occupant may affix connector 115 to a corresponding receptable (e.g., receptacle 166 of panel 150) to secure the restraint system. Upper tensioner 113 may apply a first force on upper span 111, which may partially be transmitted to lower span 112 or not be transmitted at all. Lower tensioner 114 may apply a second force on lower span 112, which may partially be transmitted to upper span 111 or not be transmitted at all. Accordingly, connector 115 may reduce or prevent tension in one span of the belt from affecting the other span, thus causing some slack to form in one of the spans.

Panel 150 shows a front view of a system that includes a seat and restraint system. The seat includes upper portion 151 and lower portion 152. The restraint system includes a belt having upper span 161 anchored at upper tensioner 163, and lower span 162 anchored at lower tensioner 164. In some embodiments, the belt passes through connector 165, which may include a passthrough (e.g., a D-loop, ring, or slot) and a buckle mechanism (e.g., for engaging with receptacle 166 affixed to lower portion 152 or the vehicle floor). For example, upper span 161 and lower span 162 may be spans of a single belt passing through a loop of connector 165. In some embodiments upper span 161 and lower span 162 are separate belts, each connected to connector 165.

In an illustrative example, an occupant may sit on lower portion 152 and lean back against upper portion 151. After sitting, the occupant may affix connector 165 to receptacle 166 to secure the restraint system. Upper tensioner 163 may apply a first force on upper span 161, which may be transmitted partially to lower span 162 in some embodiments, but need not be transmitted at all. Lower tensioner 164 may apply a second force on lower span 162, which may be transmitted partially to upper span 161 in some embodiments, but need not be transmitted at all. Accordingly, connector 165 may reduce or prevent tension in one span of the belt from affecting the other span, thus causing some slack to form in one of the spans.

In an illustrative example, a vehicle may be equipped with pre-crash detecting system configured to trigger either or both of upper tensioner 163 and lower tensioner 164, which may be motorized. Prior to the impact, either or both tensioners apply a force on the seatbelt to eliminate most of the slack from the seat belt system (e.g., lower span 162, upper span 161, or both). In some embodiments, upon impact, the tensioning mechanism (e.g., upper tensioner 163 and/or lower tensioner 164, for either or both shoulder and lap spans) engages (e.g., pyro-based pretensioner actuators) to further reduce slack from the already pretensioned belt. The systems of the present disclosure include force limiters (e.g., in either or both of upper tensioner 163 and lower tensioner 164) to prevent over-tensioning, which could lead to large forces on the occupant. For example, either or both of upper tensioner 163 and lower tensioner 164 may include a force limiting mechanism (e.g., an energy absorption element such as a spring, a wire, or other element to lessen or otherwise limit force) that helps ensure that a determined force threshold is not exceeded during the pre-tensioning phase for both the shoulder and the lap belt. To illustrate, either or both of upper tensioner 163 and lower tensioner 164 may include a retractor that pre-tensions through the torsion bar (e.g., of a spool on which the seatbelt is wound).

Figure 2:
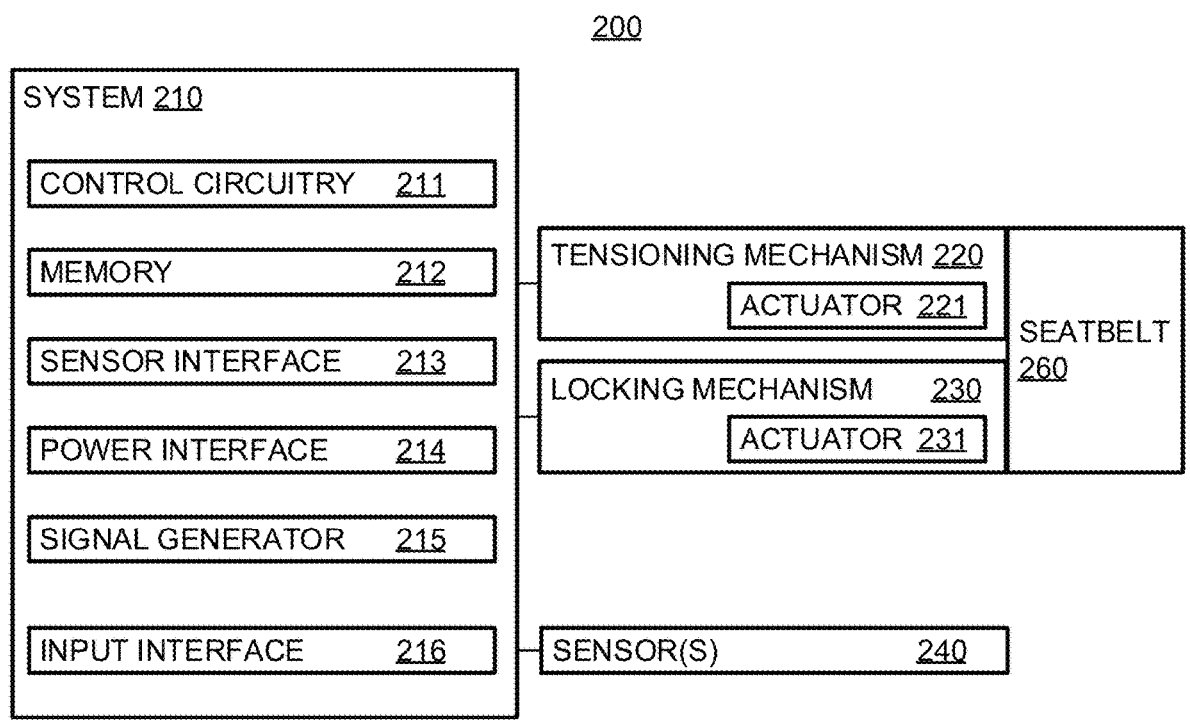
FIG. 2 shows a block diagram of an illustrative system for tensioning and locking a passenger restraint of a vehicle, in accordance with some embodiments of the present disclosure.

FIG. 2 shows a block diagram of illustrative system 210 for tensioning and locking a passenger restraint of vehicle 200, in accordance with some embodiments of the present disclosure. Vehicle 200, as illustrated, includes seatbelt 260, system 210, tensioning mechanism 220, locking mechanism 230, any suitable mechanisms which couple to tensioning mechanism 220 and locking mechanism 230, and one or more sensors 240. Tensioning mechanism 220 applies tension to a span of seatbelt 260 in response to an event. The application of tension may include applying a force to pull the span in (e.g., thus shortening it). Locking mechanism 230 prevents lengthening of the span of seatbelt 260 by locking the length of the span. As illustrated, system 210 is a restraint control system, having one or more sensors 240, control circuitry 211, memory 212, sensor interface 213, power interface 214, signal generator 215, and input interface 216. In some embodiments, vehicle 200 includes a component of a restraint system, such as a module arranged at one terminal end of a seatbelt (e.g., lower tensioner 164 of FIG. 1).

As illustrated, system 210 includes control circuitry 211 (e.g., which may include one or more processors), memory 212, sensor interface 213, power interface 214, signal generator 215, and input interface 216. Control circuitry 211 may include hardware, software, or both, implemented on one or more modules configured to provide control, monitoring, or both of tensioning mechanism 220, locking mechanism 230, or both. In some embodiments, control circuitry 211 includes one or more microprocessors, microcontrollers, digital signal processors, programmable logic devices, field-programmable gate arrays (FPGAs), application-specific integrated circuits (ASICs), or any suitable combination thereof. In some embodiments, control circuitry 211 is distributed across more than one processor or processing units. In some embodiments, control circuitry 211 executes instructions stored in memory 212 for managing one or more of tensioning mechanism 220, locking mechanism 230, and one or more sensors 240. In some embodiments, memory 212 is an electronic storage device that is part of control circuitry 211. For example, memory 212 may be configured to store electronic data, computer instructions, applications, firmware, or any other suitable information. In some embodiments, memory 212 includes random-access memory, read-only memory, hard drives, optical drives, solid state devices, or any other suitable memory storage devices, or any combination thereof. For example, memory may be used to launch a start-up routine.

In some embodiments, control circuitry 211 is powered by power interface 214, which may be coupled to a battery system, for example. In some embodiments, power interface 214 interfaces to, or includes, a car battery (e.g., a 12 V lead acid battery), a DC-DC converter, an AC power supply (e.g., generated by suitably inverting a DC power supply), any other power supply, any corresponding components (e.g., terminals, switches, fuses, and cables), or any combination thereof. In some embodiments, power interface 214 supplies power to sensor(s) 240, tensioning mechanism 220, locking mechanism 230, any other suitable systems or components, or any combination thereof. In some embodiments, control circuitry 211, sensor(s) 240, tensioning mechanism 220, locking mechanism 230, or both may be powered by power interface 214.

Sensor interface 213 is configured to provide power or otherwise excitation to sensor(s) 240, receive sensor signals from sensor(s) 240, condition a sensor signal (e.g., filter, amplify, saturate, convert, or perform other conditioning), modulate a sensor signal, digitize a sensor signal (e.g., an analog-to-digital converter), or a combination thereof. In some embodiments, sensor interface 213 is configured to sample and digitize a sensor signal from sensor(s) 240. In some embodiments, sensor(s) 240 include one or more accelerometers, force sensors, pressure sensors, strain sensors, proximity sensors, any other suitable sensors, or any combination thereof. In some embodiments, control circuitry 211 may determine a property value (e.g., an impact value), a tension, a tensioning time, a locking time, or any combination thereof based on one or more sensor signals.

Signal generator 215 is configured to generate and transmit signals (e.g., control signals). In some embodiments, signal generator 215 is configured to generate and send digital signals, provide binary signals (e.g., to control relays, switches, contactors, or transistors), provide electrical power (e.g., a DC bus for control signals), send or receive any other suitable signals, or any combination thereof. In some embodiments, signal generator 215 includes a wireless communications interface (e.g., WiFi, Bluetooth, NFC, 4-G), wired interface (e.g., ethernet with RJ-45 connectors), optical interface (e.g., a fiber optic interface), any other suitable interface, or any combination thereof for communicating with other systems or devices (e.g., transmitting signals).

Tensioning mechanism 220 (e.g., a pretensioner), as illustrated, includes actuator 221, configured to generate tension in response to an event. In some embodiments, actuator 221 is configured to generate tension in response to a control signal generated by signal generator 215. In some embodiments, tensioning mechanism 220 is controlled by control circuitry 211 using one or more actuators (e.g., actuator 221). In some embodiments, the tensioning is passively actuated by one or more mechanisms. Actuator 221 may include electromagnetic actuators, pneumatic actuators, hydraulic actuators, chemical-based actuators (e.g., such as squib charges using solid reactants), spring-loaded mechanisms, any other suitable actuators, or any combination thereof. For example, actuator 221 may include a gunpowder based squib charge that ignites to force a piston to pull an end of seatbelt 260, thus tensioning seatbelt 260 or a portion thereof (e.g., to remove any slack). In a further example, actuator 221 may include an electromagnetic rotary or linear actuator that tensions the end of seatbelt 260 to remove slack (e.g., by applying a predetermined tension or otherwise pulling the end of the seatbelt). To illustrate, tensioning mechanism 220 may include a spool that, when rotated, tensions seatbelt 260. To further illustrate, tensioning mechanism 220 may include a linear actuator (e.g., as actuator 221) that pulls seatbelt 260 using a predetermined, or otherwise limited force (e.g., by use of an energy absorption element such as that illustrated in FIGS. 3-5).

Locking mechanism 230, as illustrated, includes actuator 231, configured to prevent extension of seatbelt 260 in response to an event. In some embodiments, actuator 231 is configured to generate force (e.g., a clamping force, a latching force) in response to a control signal generated by signal generator 215. In some embodiments, locking mechanism 230 includes a toothset and latch assembly, configured to form a position detent for seatbelt 260. In some embodiments, locking mechanism 230 includes a rotation detent or limiter to prevent a spool on which seatbelt 260 is wound from allowing seatbelt 260 to extend. Actuator 231 may include, for example, electromagnetic actuators, pneumatic actuators, hydraulic actuators, chemical-based actuators (e.g., such as squib charges using solid reactants), spring-loaded mechanisms, toothed detents or latches, position detents, any other suitable actuators, any other suitable mechanisms, or any combination thereof.

Figure 3:
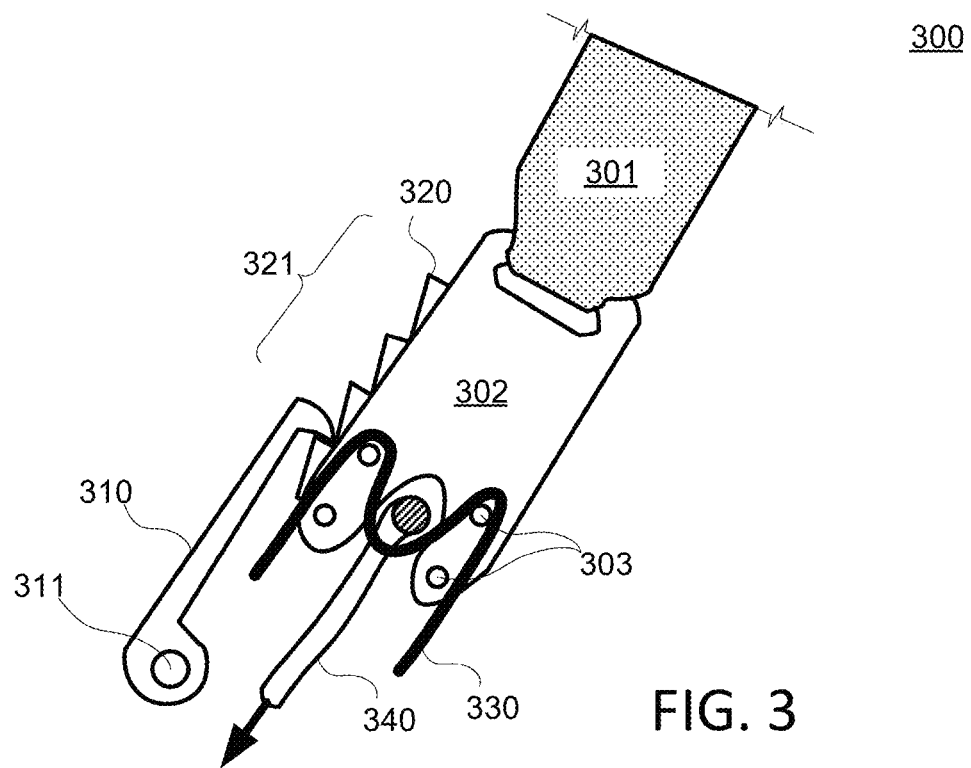
FIGS. 3-4 shows an illustrative tensioning mechanism and an illustrative locking mechanism, in two states, in accordance with some embodiments of the present disclosure.
Figure 4:
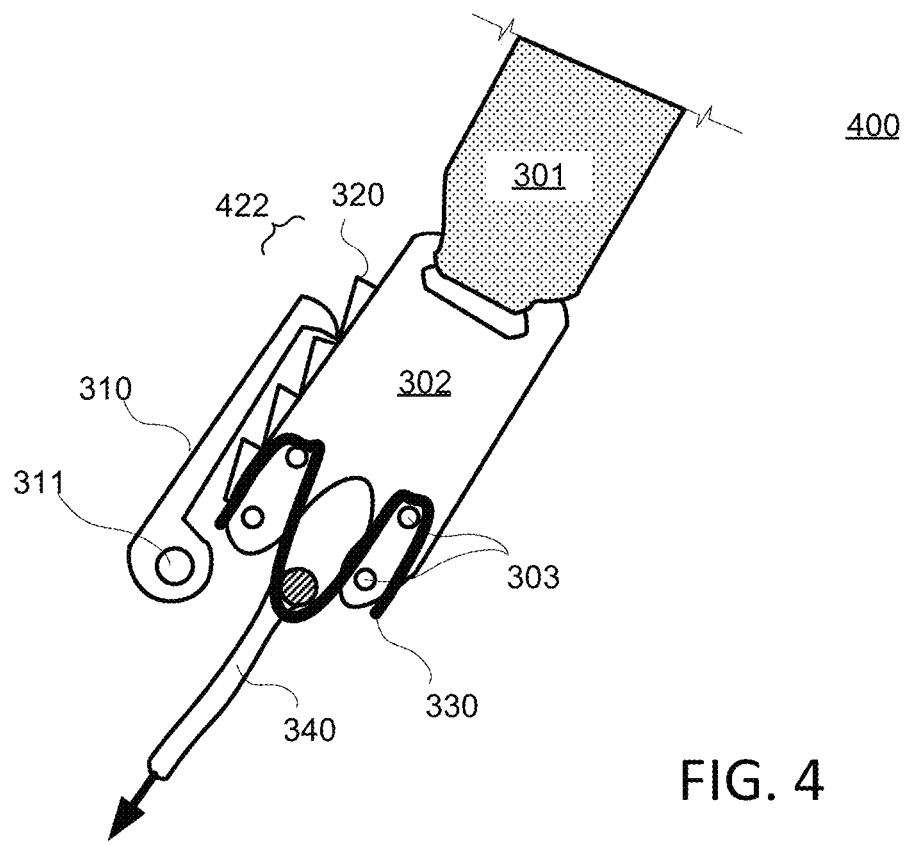

FIGS. 3-4 shows an illustrative tensioning mechanism and an illustrative locking mechanism, in two states, in accordance with some embodiments of the present disclosure. In an illustrative example, the mechanism illustrated in FIGS. 3-4 may be the same as or similar to lower tensioner 114 of FIG. 1 or lower tensioner 164 of FIG. 1.

FIG. 3 shows first configuration 300 (e.g., pre-event), and FIG. 4 shows second configuration 400 (e.g., post-event). Configuration 300 corresponds to, for example, a state wherein the occupant has buckled seatbelt 301 and some slack may exist in the lap span. Latch 310, which is pinned at pin 311, acts as a ratchet mechanism with toothset 320. For example, length 321 corresponds to a pre-event state, wherein structure 302 (e.g., a metal plate comprising toothset 320) cannot move away from pin 311, which is anchored to the vehicle. Upon the occurrence of an event, cable 340 is tensioned (e.g., a force is applied to cable 340) to remove slack in seatbelt 301 (as shown by the arrow in FIG. 4). Configuration 400 corresponds to a state after the tensioning in response to the event. The length of slack in seatbelt 301 that is removed is equal to the difference between length 321 and length 422. Latch 310 engages toothset 320 at a different tooth in second configuration 400, preventing seatbelt 301 from lengthening.

During tensioning, cable 340 engages energy absorption element 330 (e.g., a wire, having a double-u shape or any other suitable shape). Energy absorption element 330 is a force/load limiting mechanism configured to absorb energy, limit force, or otherwise lessen the force, impact, or both, transmitted from cable 340 to structure 302. In some embodiments, energy absorption element 330 (e.g., a wire that may undergo elastic or nonelastic deformation) may act as a load limiter and apply a force to structure 302. In some embodiments, energy absorption element 330 applies the same force it receives from cable 340 to structure 302 up to a force limit. For example, energy absorption element 330 may stretch elastically or plastically to absorb energy once the force increases beyond the force limit. As cable 340 pulls (e.g., applies a force to) energy absorption element 330 (e.g., a metal wire, composite wire, or wire made from any other suitable material), energy absorption element 330 engages pins 303, which are rigidly affixed to structure 302. Energy absorption element 330 pulls pins 303 and structure 302, thus causing latch 310 to ratchet as toothset 320 moves with structure 302. Because latch 310 allows toothset 320 to shorten belt 301 only, belt 301 ratchets tighter during tensioning by cable 340. Cable 340 and energy absorption element 330 represent a tensioning mechanism for structure 302 and thus seatbelt 301. Latch 310 and toothset 320 represent a locking mechanism for structure 302 and thus seatbelt 301. Any suitable actuator may be used to apply tension to cable 340 including a motor coupled to a reel assembly, linkage, or other mechanism. As illustrated in configuration 400 of FIG. 4, energy absorption element 330 is deformed (e.g., plastically) as compared to configuration 300 of FIG. 3. By deforming when loaded by cable 340, energy absorption element 330 (e.g., or any other suitable energy absorption element) deforms, thus lessening the force/load transmitted to structure 302, and thus to seatbelt 301. As illustrated, the length of energy absorption element 330 remains roughly constant as the shape deforms, although an energy absorption element may lengthen (e.g., the element may stretch, neck, or collapse, depending on the shape and stiffness), change shape, or a combination thereof. An energy absorption element (e.g., energy absorption element 330) may include a wire, a cable, a strap, a bracket (e.g., of a predetermined or otherwise lessened stiffness such that is can deform under load to act as a load limiter), any other suitable element, or any combination thereof. Load limiting, as used herein, refers to reducing an amount of force (e.g., tension) that is transmitted through a component by deformation (e.g., plastic or elastic), displacement, reconfiguration, or a combination thereof of the component or otherwise energy absorption of the component.

Figure 5:
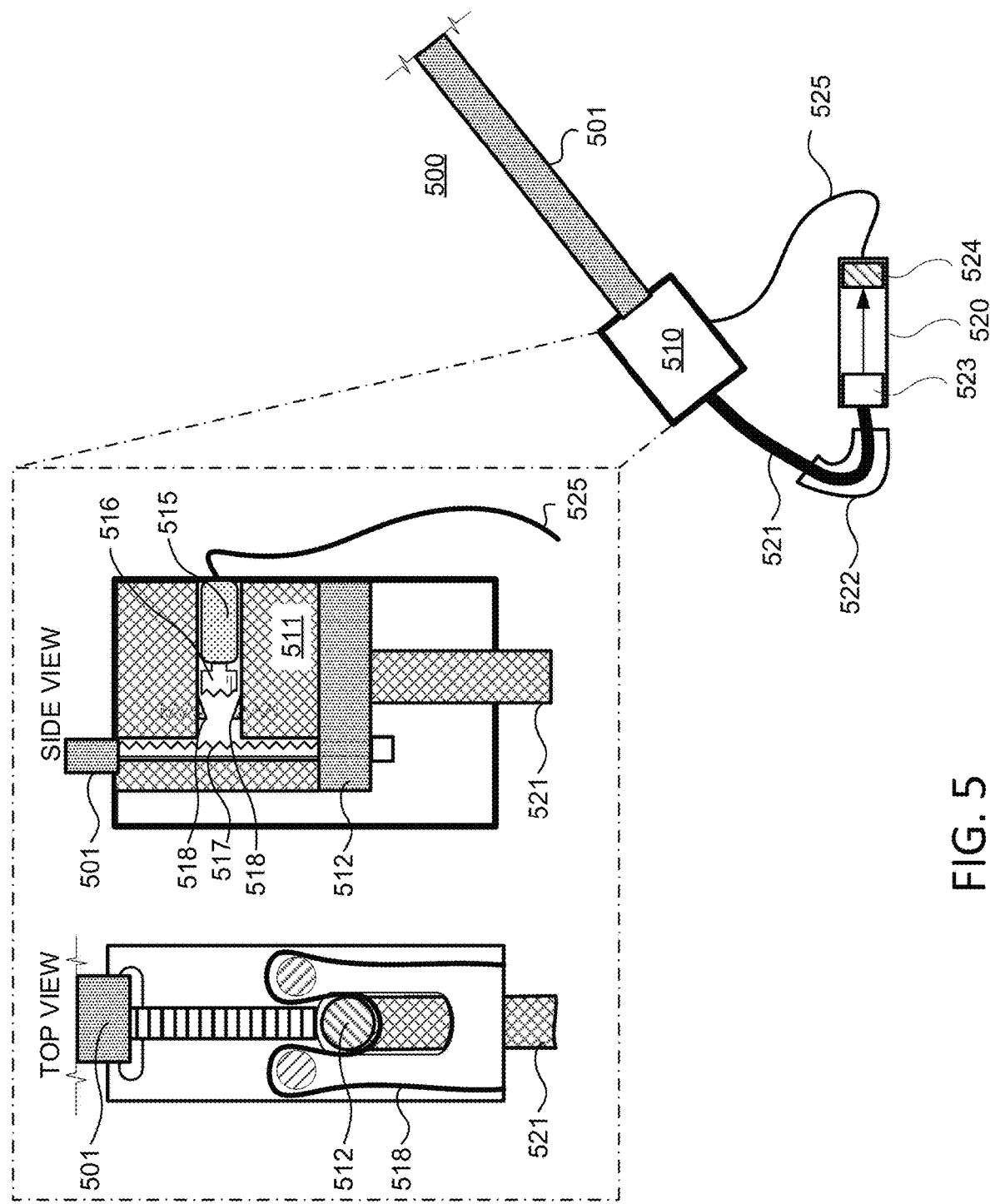
FIG. 5 shows an illustrative tensioning mechanism and an illustrative locking mechanism, using squib charges, in accordance with some embodiments of the present disclosure.

FIG. 5 shows an illustrative tensioning mechanism and an illustrative locking mechanism, using squib charges, in accordance with some embodiments of the present disclosure. System 500 includes seatbelt 501 affixed to tensioner 510, which is shown enlarged in the inset. Tensioner 510 includes body 511 coupled to pin 512, which is affixed to cable 521. Cable 521 is affixed to piston 523, which is arranged to move within cylinder 520. Limit switch 524 is arranged in cylinder 520. Upon occurrence of an event, a squib charge is ignited causing piston 523 to travel as illustrated by the arrow. As piston 523 travels, it applies tension to cable 521 thus taking up slack in seatbelt 501. Piston 523 travels until impacting limit switch 524, which then sends a signal via wire 525 to squib charge 515, which causes latch 516 to engage toothset 517 to lock seatbelt 501. Wire 518 may be included to lessen the tension applied to structure 511 by cable 521. Body 511 is fixed relative to seatbelt 501, and when latch 516 is engaged with toothset 517, seatbelt 501 is then fixed in length by being affixed to body 511 (e.g., seatbelt 501 cannot extend nor retract).

In an illustrative example, a tensioning mechanism includes a structure (toothset 517 including teeth, and pin 512) affixed to a first end of the seatbelt (e.g., seatbelt 501). An energy absorption element (e.g., wire 518) is coupled to the structure and is configured to apply a load-limited force. A cable (e.g., cable 521) is engaged with the energy absorption element and configured to receive the load-limited force. A mechanism (e.g., piston 523, cylinder 520, and limit switch 524) is configured to apply a first tension to the cable, wherein the load-limited allows a second tension (e.g., to limit tension experienced by the occupant), less than the first tension, to be applied to the structure. For example, wire 518 acts as a load limiter, which is configured to receive a first load by cable 521, but transmit a lessened load to pin 512 and thus to seatbelt 501.

Figure 6:
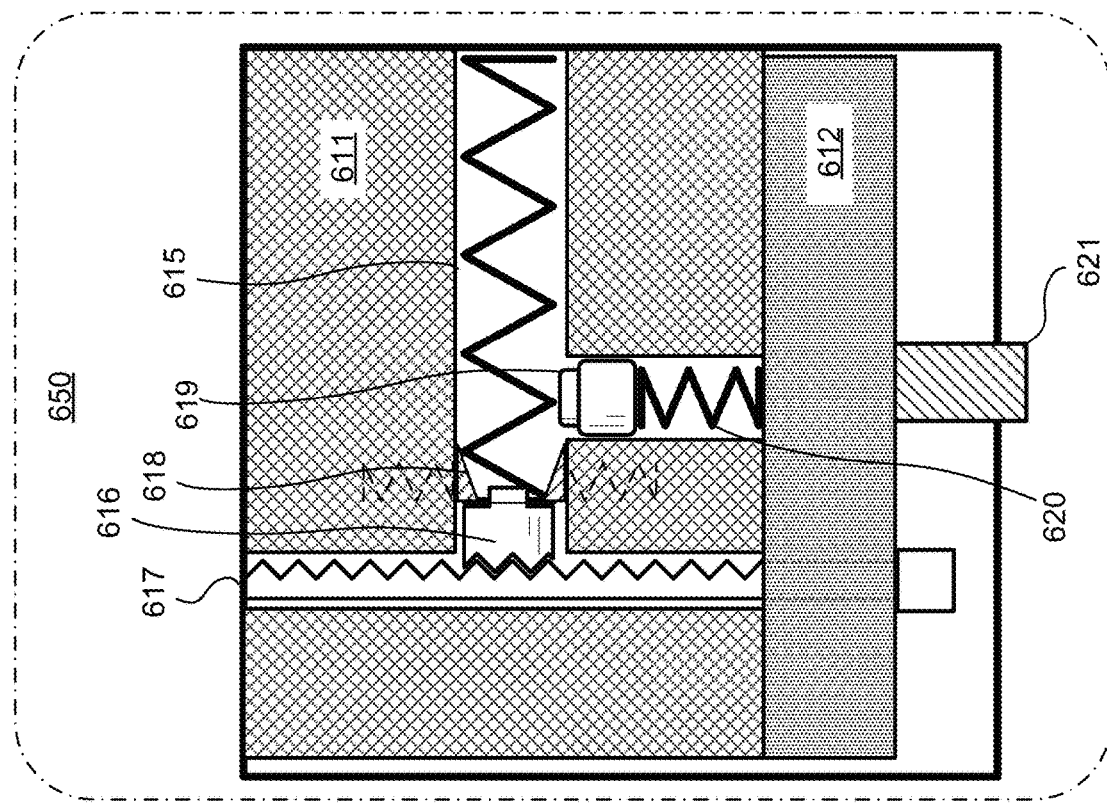
FIG. 6 shows a side cross-sectional view of an illustrative locking mechanism in two states, in accordance with some embodiments of the present disclosure.
Figure 6:
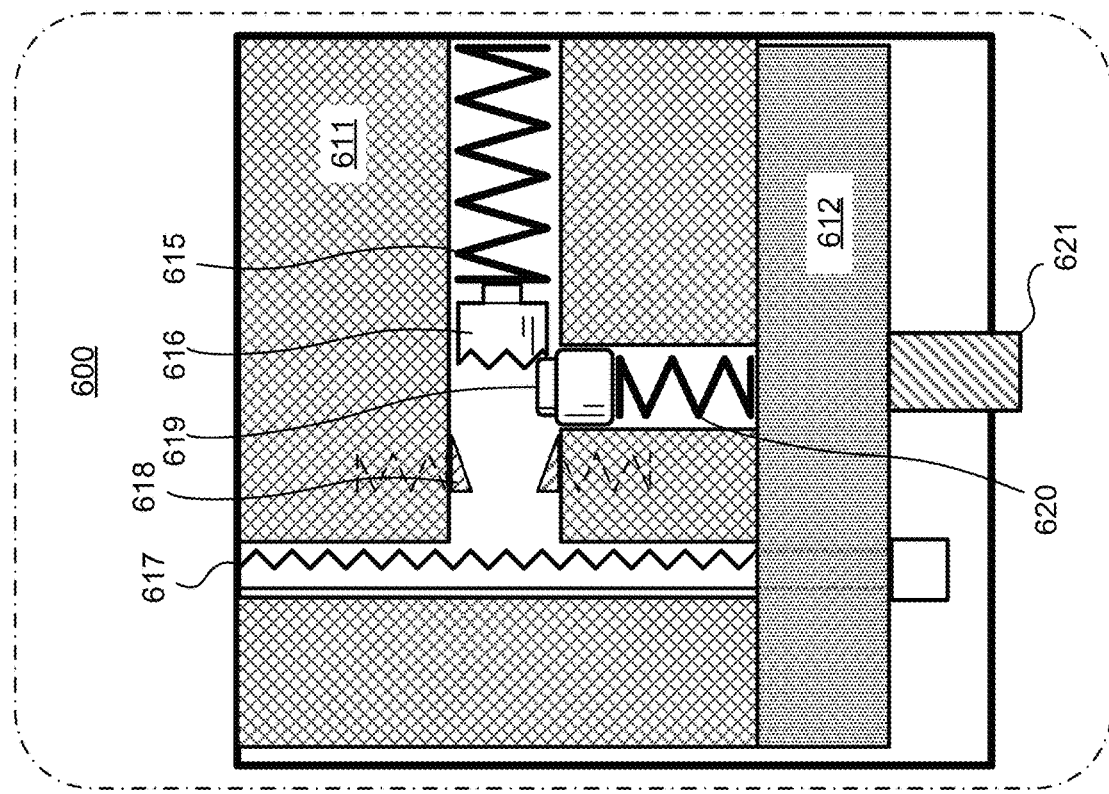

In an illustrative example, FIG. 5 relies on a separate actuator to lock the tensioning mechanism, which is merely illustrative and other designs may be used such as, for example, passive mechanical systems (e.g., spring-loaded latching systems, or toothed systems). Illustrated in FIG. 6 is an example of a passive system that relies on momentum and spring forces. For example, the impulse of the event may cause the tensioning mechanism to lock after the tensioning occurs, but before an occupant significantly applies force on the belt.

FIG. 6 shows a side cross-sectional view of an illustrative locking mechanism in two states, in accordance with some embodiments of the present disclosure. Panel 600 shows the locking mechanism in a pre-event configuration. Body 611 is coupled to pin 612, which is affixed to cable 621. Cable 621 is affixed to a tensioning mechanism. Catch 619 is held in place by spring 620, thus blocking latch 616 from engaging toothset 617. Upon occurrence of an event, a change in impulse causes catch 619 to move against spring 620, thus releasing latch 616. Spring 615 applies a force on latch 616 causing latch 616 to engage toothset 617 to perform locking.

In an illustrative example, a locking mechanism includes a structure (e.g., toothset 617 and pin 612 affixed to an end of the seatbelt. The structure includes at least one detent (e.g., here, any tooth of toothset 617). The locking mechanism also includes a latch affixed to the vehicle (e.g., latch 616, with spring 615 and spring 620) configured to engage with the detent to lock the end of the lower portion after the tensioning mechanism removes the slack.

Figure 7:
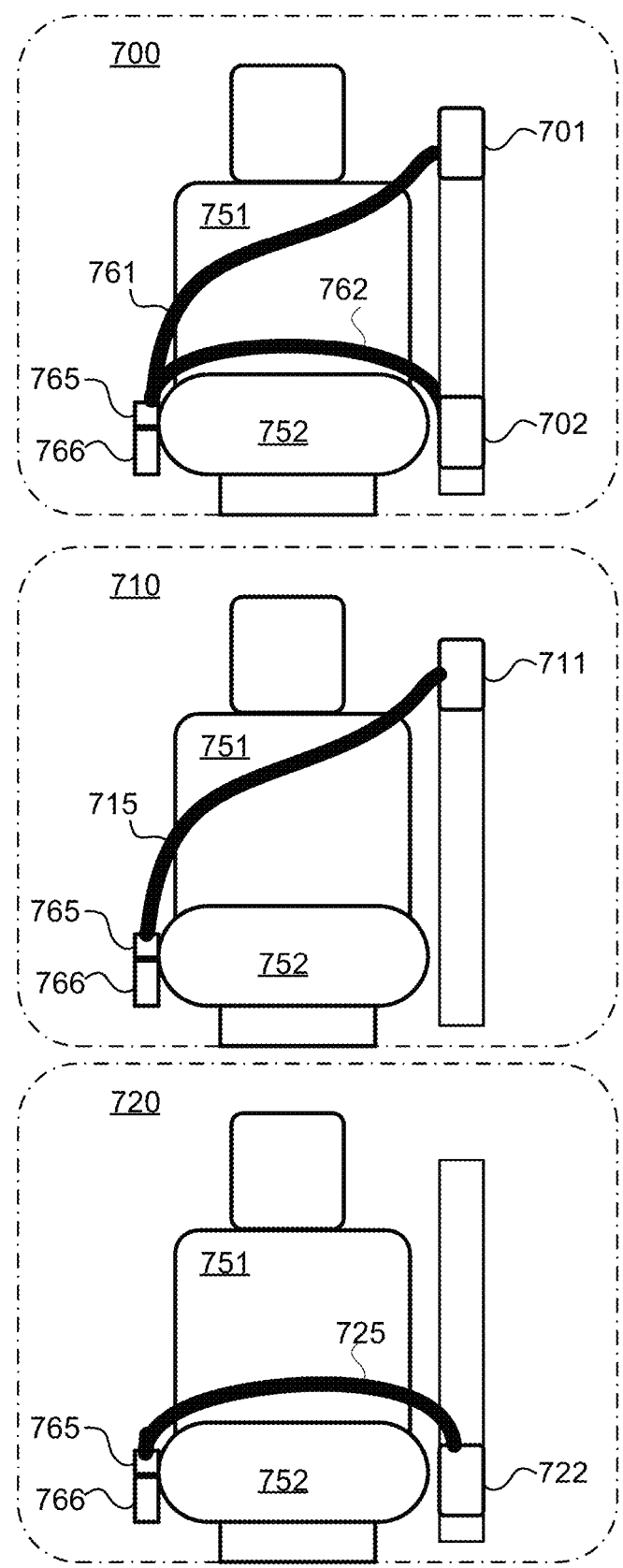
FIG. 7 shows front views of several illustrative vehicle seats having restraint systems, in accordance with some embodiments of the present disclosure.

FIG. 7 shows front views of several illustrative vehicle seats having restraint systems, in accordance with some embodiments of the present disclosure. To illustrate, the vehicle seats of FIG. 7 may be similar to the vehicle seats of FIG. 1. Panel 700 shows a front view of a system that includes a seat and restraint system. The seat includes upper portion 751 and lower portion 752. The restraint system includes a belt having upper span 761 anchored at upper module 701, and lower span 762 anchored at lower module 702. In some embodiments, the belt passes through connector 765, which may include a passthrough (e.g., a D-loop) and a buckle mechanism (e.g., for engaging with receptacle 766 affixed to lower portion 752 or the vehicle floor). For example, upper span 761 and lower span 762 may be spans of a single belt passing through a loop of connector 765. In some embodiments upper span 761 and lower span 762 are separate belts, each connected to connector 765. Either or both of lower module 702 and upper module 701 may include one or more tensioning mechanisms (e.g., a first and a second tensioning mechanisms), a locking mechanism, or a combination thereof. For example, either of lower module 702 or upper module 701 may include a first tensioner that applies a tension in a first state (e.g., when installed by the occupant, with an included detent or one-direction limiter), a second tensioner configured to take up slack in the respective span 762 or 761 in response to an event, and a locking mechanism to prevent extension after the event is detected and the slack is removed.

In an illustrative example, an occupant may sit on lower portion 752 and lean back against upper portion 751. After sitting, the occupant may affix connector 765 to receptacle 766 to secure the restraint system. Upper module 701 may apply a first force on upper span 761, which may be transmitted partially to lower span 762 in some embodiments, but need not be transmitted at all. Lower module 702 may apply a second force on lower span 762, which may be transmitted partially to upper span 761 in some embodiments, but need not be transmitted at all. Accordingly, connector 765 may reduce or prevent tension in one span of the belt from affecting the other span, thus causing some slack to form in one of the spans.

Panel 710 shows a front view of a system that includes a seat and restraint system. The seat includes upper portion 751 and lower portion 752. The restraint system includes a belt having span 715 anchored at upper module 711. In some embodiments, the belt end includes connector 765 for engaging with receptacle 766 affixed to lower portion 752 or the vehicle floor). Upper module 711 may include one or more tensioning mechanisms (e.g., a first and a second tensioning mechanisms), a locking mechanism, or a combination thereof. For example, upper module 711 may include a first tensioner that applies a tension in a first state (e.g., when installed by the occupant, with an included detent or one-direction limiter), a second tensioner configured to take up slack in span 715 in response to an event, and a locking mechanism to prevent extension after the event is detected and the slack is removed.

Panel 720 shows a front view of a system that includes a seat and restraint system. The seat includes upper portion 751 and lower portion 752. The restraint system includes a belt having span 725 anchored at lower module 722. In some embodiments, the belt end includes connector 765 for engaging with receptacle 766 affixed to lower portion 752 or the vehicle floor). Lower module 722 may include one or more tensioning mechanisms (e.g., a first and a second tensioning mechanisms), a locking mechanism, or a combination thereof. For example, lower module 722 may include a first tensioner that applies a tension in a first state (e.g., when installed by the occupant, with an included detent or one-direction limiter), a second tensioner configured to take up slack in span 725 in response to an event, and a locking mechanism to prevent extension after the event is detected and the slack is removed.

Figure 8:
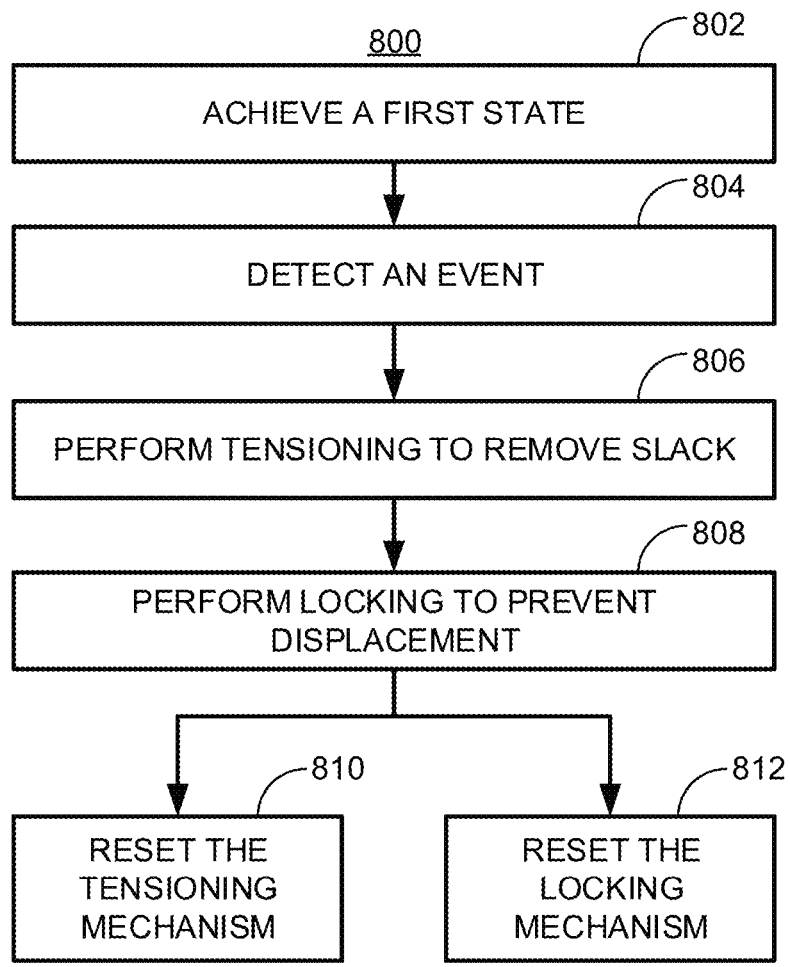
FIG. 8 shows a flow chart of an illustrative process for tensioning and locking a passenger restraint, in accordance with some embodiments of the present disclosure.

FIG. 8 shows a flow chart of illustrative process 800 for tensioning and locking a passenger restraint, in accordance with some embodiments of the present disclosure. Process 800 may be implemented using system 210, tensioning mechanism 220, locking mechanism 230, and sensor 240 of FIG. 2, for example.

Step 802 includes achieving a first state. The first state may correspond to a condition where an occupant has applied the seatbelt prior to any event. In some circumstances, the first state may include the seatbelt secured, with a first tension in the lower portion and a second tension in the upper portion. In some circumstances, the same tension may be applied to the lower and upper portions (e.g., wherein the seatbelt is free to slide relative to an intermediate ring or other passthrough). In the first state, the lower portion, the upper portion, or both may exhibit low or zero tension, wherein some slack is present. The slack may be caused by an adjustment by the occupant or other condition.

Step 804 includes the system detecting an event. In some embodiments, a vehicle includes one or more sensors (e.g., one or more sensors 240 of FIG. 2) for sensing impact, deformation, or other indicator of a crash. The one or more sensors may be coupled to a processing unit (e.g., control circuitry 211 of FIG. 2), which in response to detecting the event, can execute instructions and generate signals to control systems. In some embodiments, the sensor includes a force sensor (e.g., to detect an impact force), an accelerometer (e.g., a piezoelectric transducer), a contact sensor (e.g., based on impedance), any other suitable sensor, or any combination thereof. In some embodiments, for example, the vehicle or restraint system thereof includes control circuitry configured to execute instructions for monitoring for events, and in response to detecting an event, controlling tensioning at step 806, and locking at step 808.

Step 806 includes the system performing tensioning to remove slack in a seatbelt (e.g., using tensioning mechanism 220 of FIG. 2). In some embodiments, the tensioning is controlled by control circuitry using one or more actuators. In some embodiments, the tensioning is passively actuated by one or more mechanisms. The actuator(s) may include electromagnetic actuators, pneumatic actuators, hydraulic actuators, chemical-based actuators (e.g., such as squib charges using solid reactants), spring-loaded mechanisms, any other suitable actuators, or any combination thereof. For example, the actuator may include a gunpowder based squib charge that ignites to force a piston to pull an end of the seatbelt, thus tensioning the seatbelt or a portion thereof (e.g., to remove any slack). In a further example, the actuator may include an electromagnetic rotary or linear actuator that tensions the end of the seatbelt to remove slack (e.g., by applying a predetermined tension or otherwise pulling the end of the seatbelt). To illustrate, the tensioning mechanism may include a spool that, when rotated, tensions the seatbelt. To further illustrate, the tensioning mechanism may include a linear actuator that pulls the seatbelt using a predetermined, or otherwise limited force (e.g., by use of an energy absorption element or other suitable load limiter such as that illustrated in FIGS. 3-5).

Step 808 includes the system performing locking to prevent lengthening of a seatbelt (e.g., using locking mechanism 230 of FIG. 2). In some embodiments, the locking is controlled be control circuitry (e.g., control circuitry 211 of FIG. 2) using one or more actuators (e.g., as illustrated by locking mechanism 230 in FIG. 2). In some embodiments, the locking is passively actuated by one or more mechanisms. Step 808 may include, for example, engaging a toothset with one or more corresponding teeth to prevent displacement, applying a clamping or latching force to prevent displacement, locking a spool on which the seatbelt is wound, ant other suitable locking technique, or any combination thereof.

Step 810 includes the system resetting the tensioning mechanism after the event occurs. In some embodiments, step 810 includes control circuitry (e.g., control circuitry 211 or signal generator 215 of FIG. 2) generating, or ceasing to generate, a control signal transmitted to the tensioning mechanism, thus releasing the tensioning mechanism. In some embodiments, step 810 includes a manual reset, wherein a user releases tension on the belt or otherwise returns the tensioning mechanism to the state prior to the event detection at step 804. In some embodiments, step 810 includes releasing tension on the lower portion by disengaging the tensioning mechanism.

Step 812 includes the system resetting the locking mechanism after the event occurs. In some embodiments, step 810 includes control circuitry (e.g., control circuitry 211 or signal generator 215 of FIG. 2) generating, or ceasing to generate, a control signal transmitted to the locking mechanism, thus releasing the locking mechanism, and allowing the seatbelt to extend or retract. In some embodiments, step 812 includes a manual reset, wherein a user releases the lock on the belt or otherwise returns the locking mechanism to the state prior to the event detection at step 804. In some embodiments, step 812 includes unlocking the lower portion, by disengaging the locking mechanism, to allow displacement of the lower portion.

In an illustrative example, the system (e.g., system 200 of FIG. 2) may include control circuitry coupled to the tensioning mechanism (e.g., tensioning mechanism 220 of FIG. 2). The control circuitry may be configured to detect the event at step 804, and transmit a control signal to the tensioning mechanism in response to the event at step 806, wherein the control signal causes the tensioning mechanism to apply a tension.

In a further illustrative example, the system (e.g., system 200 of FIG. 2) may include control circuitry coupled to the locking mechanism (e.g., locking mechanism 230 of FIG. 2). The control circuitry may be configured to detect the event at step 8304, and transmit a control signal to the locking mechanism in response to the event at step 808, wherein the control signal causes the locking mechanism to prevent the seatbelt from extending.

In a further illustrative example, the system (e.g., system 200 of FIG. 2) may include control circuitry coupled to the tensioning mechanism (e.g., tensioning mechanism 220 of FIG. 2) and to the locking mechanism (e.g., locking mechanism 230 of FIG. 2). The control circuitry may be configured to transmit a first control signal to the tensioning mechanism in response to the event at step 806 (e.g., the first control signal causes the tensioning mechanism to apply a tension), and to transmit a second control signal to the locking mechanism at step 808 (e.g., the second control signal causes the locking mechanism to prevent the seatbelt from extending).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system for providing occupant restraint, the system comprising:
    a seatbelt having an end;

a load limiting tensioning mechanism configured to apply a first force to a force limiting mechanism, which transmits a second limited force to the end of the seatbelt to remove slack from the end of the seatbelt in response to an event;

a locking mechanism configured to lock the end of the seatbelt after the load limiting tensioning mechanism removes the slack; and control circuitry configured to:
  detect the event; and
  in response to the event, at least one of:
    transmit a control signal to the load limiting tensioning mechanism that causes the load limiting tensioning mechanism to apply the first force; or
    transmit a control signal to the locking mechanism that causes the locking mechanism to lock the end of the seatbelt.

2. The system of claim 1, wherein the load limiting tensioning mechanism comprises:
  a structure affixed to the end of the seatbelt, wherein the force limiting mechanism is coupled to the structure;
  a cable engaged with the force limiting mechanism; and
  a mechanism configured to apply the first force to the cable, wherein the force limiting mechanism allows the second limited force, less than the first force, to be applied to the structure.

3. The system of claim 1, wherein the load limiting tensioning mechanism comprises a wire formed in a double-u shape.

4. The system of claim 1, further comprising:
  a connector that defines an upper portion of the seatbelt and a lower portion of the seatbelt, wherein the lower portion comprises the end and wherein the load limiting tensioning mechanism is configured to remove the slack in the lower portion of the seatbelt from the end.

5. The system of claim 1, wherein the load limiting tensioning mechanism comprises:
  a piston and a cylinder, wherein the piston is configured to translate along the cylinder;
  a cable comprising a first end and a second end, the cable coupled to the seatbelt at the first end and coupled to the piston at the second end;
  a squib charge configured to cause the piston to translate along the cylinder to apply tension to the seatbelt; and
  a limit switch arranged at a position along the cylinder and configured to provide a signal when the piston reaches the position along the cylinder.

6. The system of claim 1, wherein the locking mechanism comprises:
  a structure affixed to the end of the seatbelt, the structure comprising at least one detent; and
  a latch affixed to a vehicle and configured to engage with the detent to lock the end of the seatbelt after the tensioning mechanism removes the slack.

7. The system of claim 1, wherein the locking mechanism comprises:
  a first element configured to move with the end of the seatbelt;
  a second element configured to engage with the first element; and
  a latch configured to engage the second element with the first element to prevent the first element from moving, thereby locking the end of the seatbelt after the load limiting tensioning mechanism removes the slack.

8. The system of claim 1, wherein the force limiting mechanism applies the first force to the end of the seatbelt up to a force limit, beyond which the force limiting mechanism reduces an amount of the first force transmitted to the end of the seatbelt.

9. A system for providing occupant restraint, the system comprising:
  a seatbelt having an end;
  a tensioning mechanism configured to apply a first force to a force limiting mechanism, which transmits a second limited force to the end of the seatbelt to remove slack in the seatbelt;
  a locking mechanism configured to lock the end of the seatbelt after the tensioning mechanism removes the slack to prevent lengthening of the seatbelt; and
  control circuitry configured to:
    detect an event; and
    in response to the event, at least one of:
      transmit a control signal to the load limiting tensioning mechanism that causes the load limiting tensioning mechanism to apply the first force; or
      transmit a control signal to the locking mechanism that causes the locking mechanism to lock the end of the seatbelt.

10. The system of claim 9, wherein the seatbelt comprises an upper portion and a lower portion and wherein the tensioning mechanism is configured to remove the slack in the lower portion of the seatbelt.

11. The system of claim 9, wherein the tensioning mechanism comprises:
  a piston and a cylinder, wherein the piston is configured to translate along the cylinder;
  a cable comprising a first end and a second end, the cable coupled to the seatbelt at the first end and coupled to the piston at the second end;
  a squib charge configured to cause the piston to translate along the cylinder to apply tension to the seatbelt; and
  a limit switch arranged at a position along the cylinder and configured to provide a signal when the piston reaches the position.

12. The system of claim 9, wherein the tensioning mechanism comprises:
  a structure affixed to the end of the seatbelt, wherein the force limiting mechanism coupled to the structure;
  a cable engaged with the force limiting mechanism; and
  a mechanism configured to apply the first force to the cable, wherein the force limiting mechanism allows the second limited force, less than the first force, to be applied to the structure.

13. The system of claim 9, wherein the locking mechanism comprises:
  a structure affixed to the end of the seatbelt, the structure comprising at least one detent; and
  a latch affixed to a vehicle and configured to engage with the detent to lock the end of the seatbelt after the tensioning mechanism removes the slack.

14. The system of claim 9, wherein the tensioning mechanism comprises a wire formed configured to limit a load transmitted to the seatbelt.

15. The system of claim 9, wherein the force limiting mechanism applies the first force to the end of the seatbelt up to a force limit, beyond which the force limiting mechanism reduces an amount of the first force transmitted to the end of the seatbelt.

16. A method of tightening a seatbelt, wherein the seatbelt comprises an end, the method comprising:
  detecting, using control circuitry, a vehicle event corresponding to impact;

transmitting, using the control circuitry, a control signal to a tensioning mechanism that causes the tensioning mechanism to apply a first force to a force limiting mechanism, wherein the force limiting mechanism is configured to apply a second limited force to the end of the seatbelt to remove slack; and transmitting a control signal to a locking mechanism to lock the end to prevent displacement of the seatbelt after the slack has been removed.

17. The method of claim 16, wherein the seatbelt comprises an upper portion and a lower portion and wherein the second limited force to the end of the seatbelt removes slack in the lower portion.

18. The method of claim 16, further comprising:

achieving a first state prior to detecting the vehicle event, wherein the seatbelt comprises no tension; and achieving a second state after the slack has been removed, wherein the seatbelt comprises a tension greater than zero.

19. The method of claim 16, wherein the force limiting mechanism applies the first force to the end of the seatbelt up to a force limit, beyond which the force limiting mechanism reduces an amount of the first force transmitted to the end of the seatbelt.

* * * * *